US009073533B2

(12) United States Patent
Gauthier (10) Patent No.: US 9,073,533 B2
(45) Date of Patent: Jul. 7, 2015

(54) WIDE OPEN THROTTLE GUARD FOR A VEHICLE FOR HIGH ELEVATION CHANGES

(71) Applicant: Toyota Motor Engineering & Manufacturing North America, Inc., Erlanger, KY (US)

(72) Inventor: Christopher T. Gauthier, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 59 days.

(21) Appl. No.: 13/954,829

(22) Filed: Jul. 30, 2013

(65) Prior Publication Data
US 2015/0039192 A1 Feb. 5, 2015

(51) Int. Cl.
G06F 7/00 (2006.01)
B60W 10/06 (2006.01)
B60W 10/10 (2012.01)

(52) U.S. Cl.
CPC ....... *B60W 10/06* (2013.01); *B60W 2510/0619* (2013.01); *B60W 2550/145* (2013.01); *B60W 10/10* (2013.01)

(58) Field of Classification Search
CPC .............. B60W 10/04; B60W 10/06; B60W 2510/0619; B60W 2550/145; B60W 2710/0622; B60W 2710/0666; B60W 10/10; F02N 2200/121; F02N 2200/124
See application file for complete search history.

(56) References Cited

U.S. PATENT DOCUMENTS

| 4,211,119 | A | | 7/1980 | Wolber | |
|---|---|---|---|---|---|
| 4,747,269 | A | | 5/1988 | David | |
| 4,943,921 | A | * | 7/1990 | Baltusis et al. | 701/55 |
| 5,305,662 | A | * | 4/1994 | Togai et al. | 477/43 |
| 5,546,907 | A | | 8/1996 | Komoriya et al. | |
| 5,549,092 | A | | 8/1996 | Hasegawa et al. | |
| 5,609,126 | A | | 3/1997 | Cullen et al. | |
| 6,077,186 | A | | 6/2000 | Kojima et al. | |
| 6,389,348 | B1 | | 5/2002 | Takagi et al. | |
| 6,522,959 | B1 | | 2/2003 | Sawamura et al. | |
| 6,739,314 | B1 | | 5/2004 | Bauerle et al. | |
| 7,967,720 | B2 | | 6/2011 | Martin et al. | |
| 8,234,049 | B2 | | 7/2012 | Stempnik et al. | |
| 8,256,217 | B2 | | 9/2012 | Inoue | |
| 2009/0118963 | A1 | * | 5/2009 | Heap | 701/99 |
| 2011/0266760 | A1 | | 11/2011 | Itabashi | |

FOREIGN PATENT DOCUMENTS

EP 155414 7/2005
JP 2008298209 12/2008

* cited by examiner

*Primary Examiner* — David D Le
(74) *Attorney, Agent, or Firm* — Snell & Wilmer LLP (57) ABSTRACT

A system for improving performance of a hybrid vehicle at higher elevations. The system includes a plurality of wheels, an engine, an altitude sensor, a transmission, a memory for storing target engine speeds, and a processor. The engine provides a torque to the plurality of wheels through the transmission, based on gear ratios limited by a wide open throttle (WOT) guard. The altitude sensor determines an elevation of the vehicle. Above a certain threshold elevation, the processor changes the WOT guard to improve performance at lower gears, such as standing start performance.

43 Claims, 5 Drawing Sheets

| RPM | 2500 | 5000 | 6000 |
|---|---|---|---|
| GEAR RATIO | 3.5 | 3.4 | 3.3 |
| HP | 200 | 200 | 200 |

| RPM | 2500 | 5000 | 6000 |
|---|---|---|---|
| GEAR RATIO | 3.5 | 3.5 | 3.4 |
| HP | 180 | 180 | 180 |

FIG. 5B

WIDE OPEN THROTTLE GUARD FOR A VEHICLE FOR HIGH ELEVATION CHANGES

BACKGROUND

1. Field

The present application relates to improving drivability of a continuously variable transmission (CVT) for vehicles travelling at high elevations.

2. Description of the Related Art

A CVT generally can implement an infinite number of gear ratios within maximum and minimum values for the CVT. However, at low gear ratios and high engine speeds, too much torque may damage the transmission. A wide open throttle (WOT) guard, or other similar guards, prevents damage to the transmission by limiting gear ratios at predetermined engine speeds. The WOT guard is often predetermined or tuned at a base elevation.

At higher elevations, the thinner air affects the air-fuel ratio, which ultimately affects drivability and performance of the vehicle. Due to the thinner air, less torque is produced at higher elevations than at the base elevation. However, the WOT guard remains the same. In other words, the WOT guard provides greater performance reduction than needed at higher elevations because less torque is produced.

Thus, there is a need for a CVT vehicle which improves drivability at higher elevations by adjusting the WOT guard based on altitude.

SUMMARY

The present application relates to improving hybrid vehicle performance. In one implementation, a system for controlling a transmission of a vehicle comprises a transmission capable of shifting gear ratios, an engine connected to the transmission and having an engine speed and an engine power, an altitude sensor for detecting an altitude of the vehicle, a memory for storing a gear ratio limit based on the engine speed and the engine power, and a predetermined altitude, and a processor configured to receive the altitude and adjust the gear ratio limit based on the altitude when the altitude exceeds the predetermined altitude.

In another implementation, a system for controlling a transmission of a vehicle comprises a transmission capable of shifting gear ratios, an engine connected to the transmission and having an engine speed, an engine power, and an air-fuel ratio, a sensor for detecting the air-fuel ratio, a memory for storing a gear ratio limit based on the engine speed and the engine power, and an air-fuel ratio threshold, and a processor configured to receive the air-fuel ratio and adjust the gear ratio limit based on the air-fuel ratio when the air-fuel ratio reaches the air-fuel ratio threshold.

In yet another implementation, the present application provides a method for controlling a transmission of a vehicle comprising providing a memory for storing a gear ratio limit based on an engine speed and an engine power of an engine of the vehicle, receiving a sensor value from a sensor of the vehicle, comparing the sensor value to a sensor value threshold stored in the memory, and adjusting a gear ratio limit based on the sensor value.

BRIEF DESCRIPTION OF THE DRAWINGS

The features, obstacles, and advantages of the present application will become more apparent from the detailed description set forth below when taken in conjunction with the drawings, wherein.

DETAILED DESCRIPTION

Apparatus, systems and methods that implement the implementations of the various features of the present application will now be described with reference to the drawings. The drawings and the associated descriptions are provided to illustrate some implementations of the present application and not to limit the scope of the present application. Throughout the drawings, reference numbers are re-used to indicate correspondence between referenced elements.

Figure 1A:
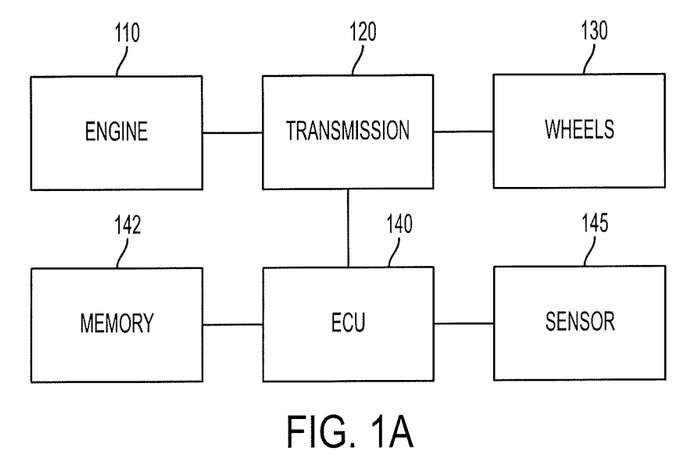
FIG. 1A is a diagram of a vehicle including an engine and a transmission according to an implementation of the present application.

FIG. 1A presents a block diagram of a vehicle 100. The vehicle 100 includes an engine 110, a transmission 120, wheels 130, an ECU 140, a memory 142, and a sensor 145. The engine 110 can be an internal combustion engine (ICE). The ICE can combust fuel, such as gasoline, ethanol, diesel, biofuel, or other types of fuels which are suitable for combustion. In other implementations, the engine 110 may be an electric motor.

The transmission 120 may be a step transmission, such as an automatic transmission (AT), or may be a CVT. The transmission 120 provides power to the wheels 130 to move the vehicle 100. The ECU 140 may be a processor configured to command the transmission 120 to shift gears. The memory 142 is configured to store a WOT guard value or other similar gear ratio limit.

The sensor 145 may include one or more sensors. The sensor 145 may be an altitude sensor capable of determining an altitude or elevation of the vehicle 100. Alternatively, or in addition to the altitude sensor, the sensor 145 may be an oxygen (O2) sensor that detects an air-fuel ratio of the engine 110. In other implementations, the sensor 145 may be any suitable sensor for determining reduced vehicle performance either directly or indirectly.

Figure 1B:
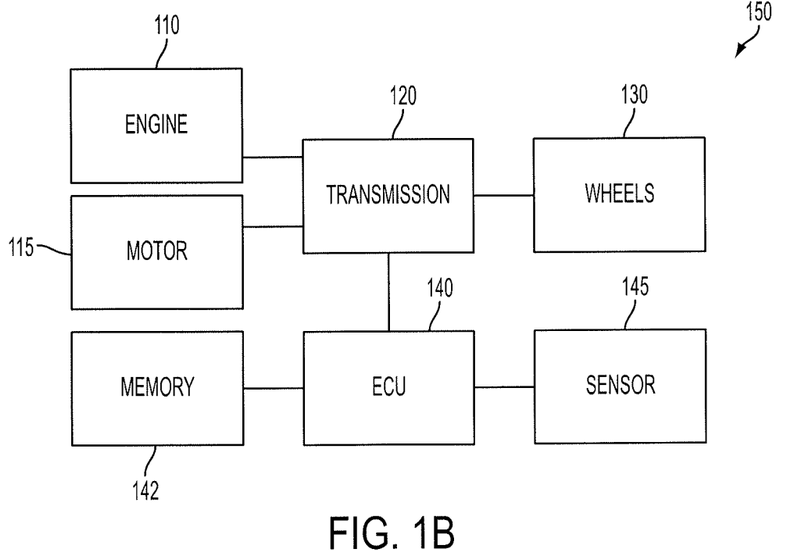
FIG. 1B is a diagram of a hybrid vehicle including an engine and a transmission according to an implementation of the present application.

FIG. 1B presents a block diagram of a hybrid vehicle 150. The hybrid vehicle 150 includes an engine 110, a motor 115, a transmission 120, an ECU 140, a sensor 145, and wheels 130. The motor 115 may be a motor-generator or other electrical motor, which works in conjunction with the engine 110 in a hybrid system. Alternatively, the motor 115 may be two motors operating in tandem to output torque and/or serve as a generator. Because of the hybrid system, the transmission 120 may be a CVT rather than an AT. Other similarly named components may operate in a similar manner to the components of the vehicle 100.

Because a CVT generally has an infinite range of gear ratios between a minimum and a maximum for the CVT, the CVT may utilize gear ratios that may damage or degrade the CVT at certain engine speeds. For example, low gear ratios may provide more torque than high gear ratios. At high engine speeds, the low gear ratios may provide too much torque which may damage or degrade the CVT. A WOT guard prevents this by limiting a minimum gear ratio based on the engine speed.

Figure 2A:
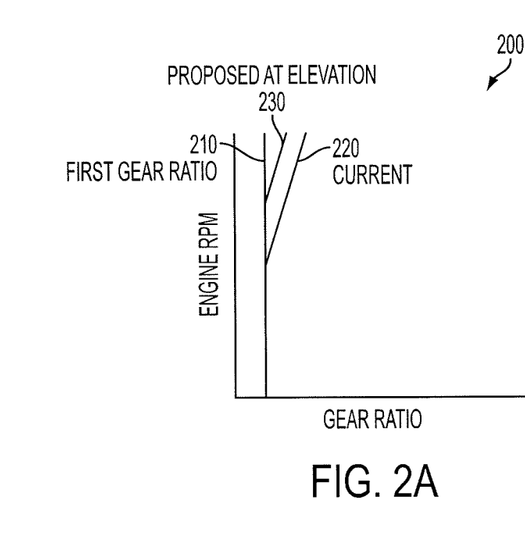
FIG. 2A is a graph relating gear ratio to engine RPM according to an implementation of the present application.

FIG. 2A presents a graph 200 of gear ratio to engine revolutions per minute (RPM). The first gear ratio is represented by a first gear curve 210. A current curve 220 represents the current WOT guard limit. As seen in FIG. 2A, the current curve 220 tapers out as the engine RPM rises, indicating that the minimum gear ratio is raised, and that the CVT starts shifting towards the second gear ratio.

The current curve 220 presents a safeguard, which may be too limiting in certain conditions. For example, in higher elevations, the same gear ratio and engine speed would not produce the same power or torque. The thinner air at higher elevations affects the air-fuel ratio, resulting in less combustion in the engine and reduced performance. The thinner air mixes with the same amount of fuel, creating a richer mixture. The excessive fuel causes the engine to lose power and run rougher. Therefore, at higher elevations, the current curve 220 provides more than needed protection. In other words, the minimum gear ratio can be safely lowered at higher elevations because the engine cannot perform as well as in lower elevations. In addition, a driver may notice the reduced performance at higher elevations. In particular, standing start performance is reduced, because less torque is available at lower gears.

A modified curve 230 represents the modified WOT guard limit. At higher elevations, the modified curve 230 allows more torque and/or performance without damaging the CVT. As seen in FIG. 2A, the modified curve 230 tapers out at a higher engine speed. The modified curve 230 starts shifting towards the second gear later than in the current curve 220.

Figure 2B:
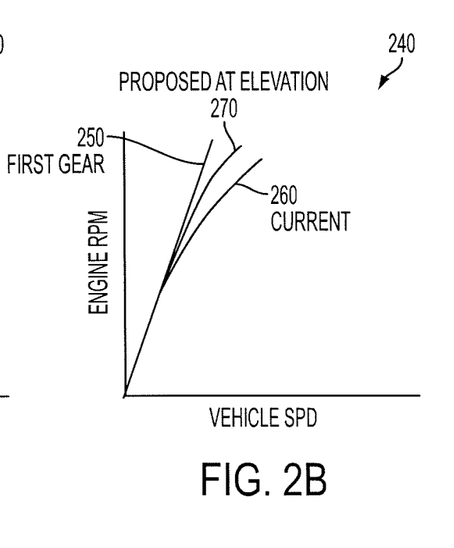
FIG. 2B is a graph relating vehicle speed to engine RPM according to an implementation of the present application.

FIG. 2B presents a graph 240 of vehicle speed to engine RPM. Similar to FIG. 2A, a first gear curve 250 represents the first gear ratio. A current curve 260 indicates the current WOT guard limit, and a modified curve 270 indicates the modified WOT guard limit at higher elevations. Similar to the modified curve 230, the modified curve 270 allows for higher engine speeds for a given vehicle speed.

Figure 2C:
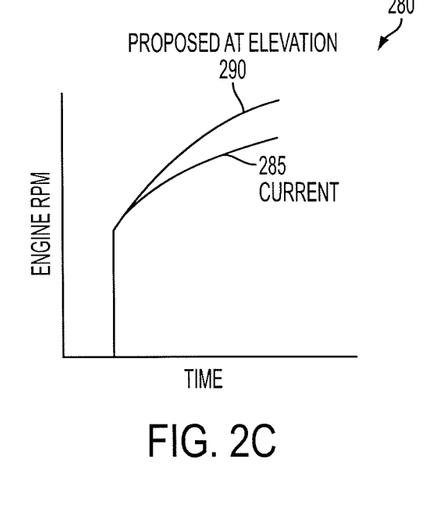
FIG. 2C is a graph relating time to engine RPM according to an implementation of the present application.

FIG. 2C presents a graph 280 of engine RPM over time. A current curve 285 indicates the current WOT guard limit, and a modified curve 290 indicates the modified WOT guard limit at higher elevations. As the engine RPM rises over time, the current curve 285 decelerates the rise in engine RPM. With the modified curve 290, the deceleration is reduced, allowing for higher engine RPMs than normal. The modified curve 290 further allows higher engine RPMs to be held longer than normal.

Figure 3A:
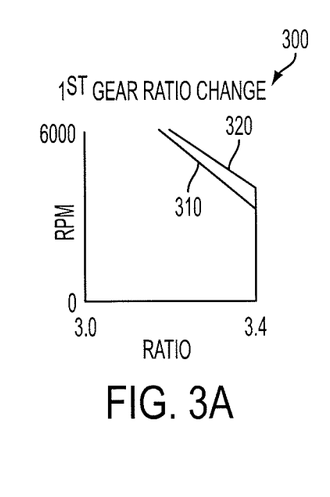
FIG. 3A is a graph of gear ratio to engine RPM at two elevations according to an implementation of the present application.
Figure 3B:
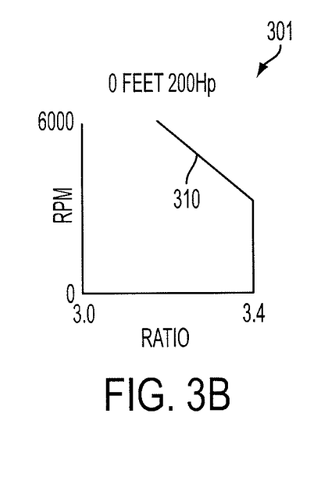
FIG. 3B is a graph of gear ratio to engine RPM at a low elevation according to an implementation of the present application.
Figure 3C:
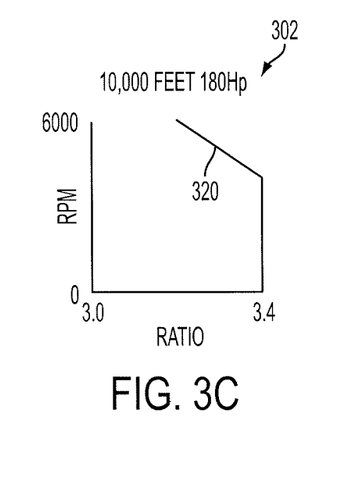
FIG. 3C is a graph of gear ratio to engine RPM at a high elevation according to an implementation of the present application.

FIGS. 3A-3C illustrate graphs 300, 301, and 302 showing low elevation curve 310 and high elevation curve 320. FIG. 3B shows only the low elevation curve 310 and FIG. 3C shows only the high elevation curve 320. FIG. 3A shows both the low elevation curve 310 and the high elevation curve 320. The low elevation curve 310 may represent normal operation with an active WOT guard, which may be conventionally used at all elevations. The high elevation curve 320 represents operation with an adjusted WOT guard according to an implementation of the present application.

The low elevation curve 310 starts at a current gear ratio of 3.4, e.g., a first gear. As the engine RPM increases, the CVT will begin transitioning to a gear ratio of 3.0, e.g., a second gear. At 0 feet of elevation, about 200 horsepower (HP) may be produced. At about 10,000 feet, only around 180 HP may be produced, due to the thinner air, for example. Since less HP is produced, the transmission may stay at the lower gear for a longer period of time without damaging the transmission. For example, low gears such as the first or second gears may be held for a longer period of time. As seen by the high elevation curve 320, the transition to the second gear occurs at a higher engine RPM than in the low elevation curve 310. The adjusted WOT guard allows the transmission to stay longer at a lower gear when at a higher elevation. For example, when performing a standing start, the adjusted WOT guard allows the transmission to stay in the first gear longer, improving acceleration because more torque is produced at the lower gears.

Figure 4:
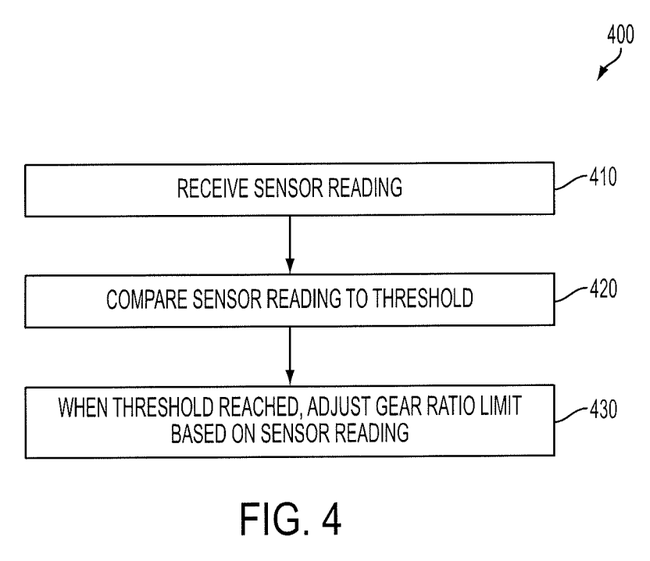
FIG. 4 is a flowchart illustrating a method for adjusting a WOT guard of a vehicle based on the vehicle's sensor reading according to an implementation of the present application.

FIG. 4 presents a flowchart 400 illustrating a method for adjusting a WOT guard of a vehicle based on the vehicle's sensor reading according to an implementation of the present application. At 410, a sensor reading is received. For the vehicle 100, the ECU 140 receives sensor readings from the sensor 145. The sensor readings may correspond to an altitude of the vehicle 100. Alternatively, the sensor readings may correspond to an air-fuel ratio of the engine 110. In other implementations, other performance metrics may be utilized for sensor readings.

At 420, the sensor reading is compared to a sensor value threshold. The threshold may correspond to a predetermined altitude or elevation above which the engine 110 suffers a noticeable performance reduction, such that the engine performance or power when the threshold is reached is less than the engine performance or power when the threshold is not met. For example, at 10,000 feet, the engine 110 may suffer a noticeable performance reduction of around 20%. In other implementations, the altitude may correspond to other performance reduction percentages. There may be more than one threshold, such that tiers or ranges of performance reduction percentages correspond to various altitude thresholds.

Alternatively, the threshold may correspond to an air-fuel ratio based on a performance reduction. For example, the threshold may correspond to an air-fuel ratio value below which the engine performance is reduced. The threshold may correspond to a rich mixture expected at, for example, 10,000 feet. In yet other implementations, the threshold may correspond to other metrics. For example, the threshold may be set by 5,000 foot increments, or any other appropriate measure. In yet other implementations, the threshold may be dynamic, such as determined through a heuristic or learning of previous driving histories.

Figure 5A:
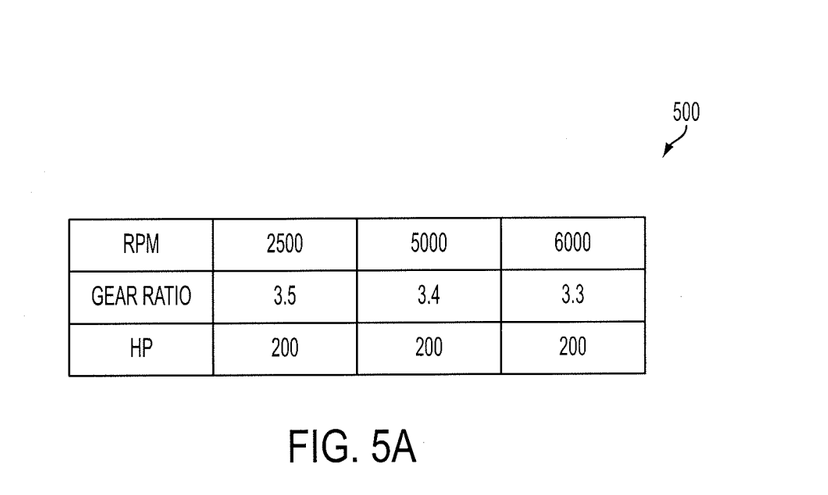
FIG. 5A is a graph of a default WOT guard according to an implementation of the present application.
Figure 5B:
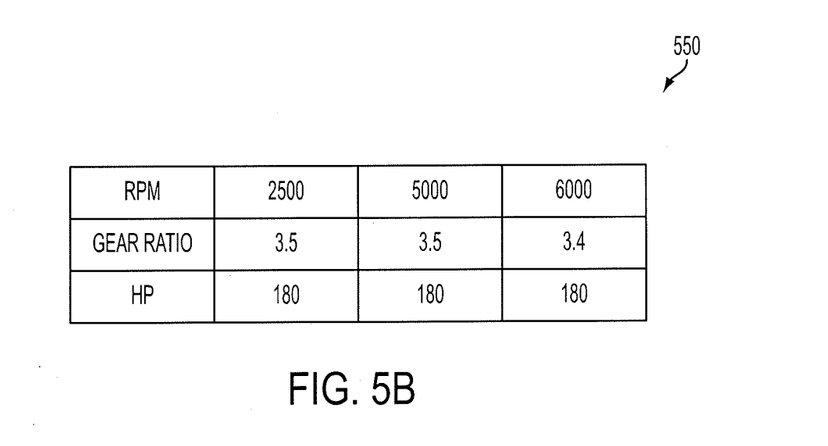
FIG. 5B is a graph of an adjusted WOT guard according to an implementation of the present application.

At 430, when the threshold is reached, the gear ratio limit is adjusted based on the sensor reading. For example, the sensor reading may be 10,101 feet, reaching the 10,000 threshold. The WOT guard may be adjusted to account for 10,000 foot elevation. FIGS. 5A and 5B illustrate an exemplary WOT guard adjustment for 10,000 feet according to one implementation of the present application.

In FIG. 5A, a graph 500 illustrates a portion of a default WOT guard which may be stored in the memory 142. Although in FIG. 5A, the WOT guard is defined as a table, in other implementations the WOT guard may be stored as raw data, a map, a heuristic, or any other algorithm. The WOT guard in FIG. 5A is based on the current engine RPM and HP.

For instance, at 5,000 RPM and 200 HP, the WOT guard would limit the gear ratio to 3.4.

FIG. 5B shows a graph 550 of a portion of an adjusted WOT guard based on the default WOT guard of FIG. 5A. Because of the reduced performance, the HP values may be adjusted, which further requires adjusting the gear ratio limit. For instance, at 5,000 RPM and now 180 HP, reduced from 200 HP, the adjusted WOT guard limits the gear ratio to 3.5 instead of 3.4. However, not all values may be adjusted. The gear ratio at 2,500 RPM remains at 3.5.

The adjustment may be a separate table stored in the memory 142. The memory 142 may store multiple adjusted tables corresponding to multiple thresholds. Alternatively, the adjustment may be dynamically calculated. For instance, the WOT guard limit may be continuously adjusted based on current sensor readings, such as elevation or air-fuel ratio. In such implementations, the threshold may be dynamic as well or not used at all.

Those of ordinary skill would appreciate that the various illustrative logical blocks, modules, and algorithm steps described in connection with the examples disclosed herein may be implemented as electronic hardware, computer software, or combinations of both. Furthermore, the present application can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described implementations are to be considered in all respects only as illustrative and not restrictive and the scope of the application is, therefore, indicated by the appended claims rather than by the foregoing description. All changes which come within the meaning and range of equivalency of the claims are to be embraced within their scope.

What is claimed is:

1. A system for adjusting a gear ratio limit of a vehicle comprising:
    a transmission configured to shift gear ratios;
    an engine coupled to the transmission and having an engine speed and an engine power;
    an altitude sensor configured to detect an altitude of the vehicle;
    a memory configured to store the gear ratio limit based on the engine speed and the engine power, and to store a predetermined altitude corresponding to an altitude above which an engine performance of the engine is reduced; and
    a processor coupled to the altitude sensor, the memory and the transmission, and that lowers the gear ratio limit based on the altitude when the altitude of the vehicle exceeds the predetermined altitude such that the transmission can stay in a lower gear for a longer period of time than if the gear ratio limit was not lowered.

2. The system of claim 1, wherein the reduction in the engine performance corresponds to less torque being applied by the engine at the engine speed and the engine power when the altitude of the vehicle is above the predetermined altitude than when the altitude of the vehicle is below the predetermined altitude.

3. The system of claim 1, wherein the memory stores the gear ratio limit in a table with gear ratio limit values, engine speed values and engine power values.

4. The system of claim 3, wherein the processor adjusts lowers the gear ratio limit by adjusting the gear ratio limit values and the engine power values.

5. The system of claim 1, wherein the processor continuously adjusts the gear ratio limit.

6. The system of claim 1, wherein the processor dynamically calculates the predetermined altitude.

7. A system for adjusting a gear ratio limit of a vehicle comprising:
    a transmission configured to shift gear ratios;
    an engine coupled to the transmission and having an engine speed, an engine power, and an air-fuel ratio;
    a sensor configured to detect the air-fuel ratio of the vehicle;
    a memory configured to store a gear ratio limit based on the engine speed and the engine power, and to store an air-fuel ratio threshold which corresponds to an air-fuel ratio value below which an engine performance of the engine is reduced; and
    a processor coupled to the sensor, the memory and the transmission and that lowers the gear ratio limit based on the air-fuel ratio when the air-fuel ratio of the vehicle reaches the air-fuel ratio threshold such that the transmission can stay in a lower gear for a longer period of time than if the gear ratio limit was not lowered.

8. The system of claim 7, wherein the reduction in the engine performance corresponds to less torque being applied by the engine at the engine speed and the engine power when the air-fuel ratio of the vehicle is below the air-fuel ratio value than when the air-fuel ratio of the vehicle is above the air-fuel ratio value.

9. The system of claim 7, wherein the memory stores the gear ratio limit in a table with gear ratio limit values, engine speed values and engine power values.

10. The system of claim 9, wherein the processor lowers the gear ratio limit by adjusting the gear ratio limit values and the engine power values.

11. The system of claim 7, wherein the processor continuously adjusts the gear ratio limit.

12. The system of claim 7, wherein the processor dynamically calculates the air-fuel ratio threshold.

13. A method for adjusting a gear ratio limit of a vehicle comprising:
   storing, in a memory, a sensor value threshold that corresponds to a reduction in an engine performance of an engine;
   storing, in the memory, the gear ratio limit for limiting a transmission of the vehicle based on an engine speed and an engine power of the engine of the vehicle;
   receiving a sensor value from a sensor of the vehicle;
   comparing the sensor value to the sensor value threshold; and
   lowering the gear ratio limit based on the sensor value when the sensor value of the vehicle reaches the sensor value threshold such that the transmission can stay in a lower gear for a longer period of time than if the gear ratio limit was not lowered.

14. The method of claim 13, wherein the sensor is an altitude sensor and the sensor value is an altitude of the vehicle.

15. The method of claim 13, wherein the sensor is an air-fuel ratio sensor and the sensor value is an air-fuel ratio of the engine.

16. The method of claim 13, wherein the reduction in the engine performance corresponds to less torque being applied by the engine at the engine speed and the engine power when the sensor value of the vehicle is one of above or below the sensor value threshold than when the sensor value of the vehicle is the other of above or below the sensor value threshold.

17. The method of claim 13, wherein storing the gear ratio limit includes storing the gear ratio limit in a table of gear ratio limit values, engine speed values and engine power values, and lowering the gear ratio limit includes adjusting the gear ratio limit values and the engine power values in the table.

18. The method of claim 13, wherein lowering the gear ratio limit includes adjusting the gear ratio limit continuously.

19. The method of claim 13, wherein lowering the gear ratio limit includes adjusting the gear ratio limit based on a driving history.

20. The method of claim 13, further comprising dynamically calculating the sensor value threshold.

21. A system for adjusting a gear ratio limit of a vehicle comprising:
   a transmission configured to shift gear ratios;
   an engine coupled to the transmission and having an engine speed and an engine power;
   an altitude sensor configured to detect an altitude of the vehicle;
   a memory configured to:
      store the gear ratio limit in a table having gear ratio limit values, engine speed values and engine power values, the gear ratio limit being based on the engine speed and the engine power, and
      store a predetermined altitude corresponding to an altitude above which an engine performance of the engine is reduced; and
   a processor coupled to the altitude sensor, the memory and the transmission, and that adjusts the gear ratio limit based on the altitude when the altitude of the vehicle exceeds the predetermined altitude.

22. The system of claim 21, wherein the reduction in the engine performance corresponds to less torque being applied by the engine at the engine speed and the engine power when the altitude of the vehicle is above the predetermined altitude than when the altitude of the vehicle is below the predetermined altitude.

23. The system of claim 21, wherein the processor adjusts the gear ratio limit by adjusting the gear ratio limit values and the engine power values.

24. The system of claim 21, wherein the processor continuously adjusts the gear ratio limit.

25. The system of claim 21, wherein the processor dynamically calculates the predetermined altitude.

26. A system for adjusting a gear ratio limit of a vehicle comprising:
   a transmission configured to shift gear ratios;
   an engine coupled to the transmission and having an engine speed, an engine power, and an air-fuel ratio;
   a sensor configured to detect the air-fuel ratio of the vehicle;
   a memory configured to:
      store the gear ratio limit in a table having gear ratio limit values, engine speed values and engine power values, the gear ratio limit being based on the engine speed and the engine power, and
      store an air-fuel ratio threshold which corresponds to an air-fuel ratio value below which an engine performance of the engine is reduced; and
   a processor coupled to the sensor, the memory and the transmission and that adjusts the gear ratio limit based on the air-fuel ratio when the air-fuel ratio of the vehicle reaches the air-fuel ratio threshold.

27. The system of claim 26, wherein the reduction in the engine performance corresponds to less torque being applied by the engine at the engine speed and the engine power when the air-fuel ratio of the vehicle is below the air-fuel ratio value than when the air-fuel ratio of the vehicle is above the air-fuel ratio value.

28. The system of claim 26, wherein the processor adjusts the gear ratio limit by adjusting the gear ratio limit values and the engine power values.

29. The system of claim 26, wherein the processor continuously adjusts the gear ratio limit.

30. The system of claim 26, wherein the processor dynamically calculates the air-fuel ratio threshold.

31. A method for adjusting a gear ratio limit of a vehicle comprising:
   storing, in a memory, a sensor value threshold that corresponds to a reduction in an engine performance of an engine;
   storing, in the memory, the gear ratio limit for limiting a transmission of the vehicle based on an engine speed and an engine power of the engine of the vehicle, the gear ratio limit being stored in a table having gear ratio limit values, engine speed values and engine power values;

receiving a sensor value from a sensor of the vehicle;

comparing the sensor value to the sensor value threshold; and adjusting the gear ratio limit based on the sensor value when the sensor value of the vehicle reaches the sensor value threshold, the gear ratio limit being adjusted by adjusting the gear ratio limit values and the engine power values in the table.

32. The method of claim 31, wherein the reduction in the engine performance corresponds to less torque being applied by the engine at the engine speed and the engine power when the sensor value of the vehicle is one of above or below the sensor value threshold than when the sensor value of the vehicle is the other of above or below the sensor value threshold.

33. The method of claim 31, wherein the sensor is an altitude sensor and the sensor value is an altitude of the vehicle.

34. The method of claim 31, wherein the sensor is an air-fuel ratio sensor and the sensor value is an air-fuel ratio of the engine.

35. The method of claim 31, wherein adjusting the gear ratio limit includes adjusting the gear ratio limit continuously.

36. The method of claim 31, wherein adjusting the gear ratio limit includes adjusting the gear ratio limit based on a driving history.

37. The method of claim 31, further comprising dynamically calculating the sensor value threshold.

38. A method for adjusting a gear ratio limit of a vehicle comprising:

storing, in a memory, a sensor value threshold that corresponds to a reduction in an engine performance of an engine;

storing, in the memory, the gear ratio limit for limiting a transmission of the vehicle based on an engine speed and an engine power of the engine of the vehicle;

receiving a sensor value from a sensor of the vehicle;

comparing the sensor value to the sensor value threshold; and adjusting the gear ratio limit based on the sensor value and a driving history when the sensor value of the vehicle reaches the sensor value threshold.

39. The method of claim 38, wherein the reduction in the engine performance corresponds to less torque being applied by the engine at the engine speed and the engine power when the sensor value of the vehicle is one of above or below the sensor value threshold than when the sensor value of the vehicle is the other of above or below the sensor value threshold.

40. The method of claim 38, wherein the sensor is an altitude sensor and the sensor value is an altitude of the vehicle.

41. The method of claim 38, wherein the sensor is an air-fuel ratio sensor and the sensor value is an air-fuel ratio of the engine.

42. The method of claim 38, wherein adjusting the gear ratio limit includes adjusting the gear ratio limit continuously.

43. The method of claim 38, further comprising dynamically calculating the sensor value threshold.

* * * * *